US011921662B2

(12) United States Patent
Levi et al.

(10) Patent No.: US 11,921,662 B2
(45) Date of Patent: Mar. 5, 2024

(54) DYNAMIC BANDWIDTH CONNECTIONS

(71) Applicant: Mellanox Technologies, Ltd., Yokneam (IL)

(72) Inventors: Dotan Levi, Kiryat Motzkin (IL); Elad Mentovich, Tel Aviv (IL); Ran Ravid, Tel Aviv (IL); Roee Shapiro, Zichron Yaakov (IL); Avraham Ganor, Shaom (IL); Paraskevas Bakopoulos, Ilion (GR); Dimitrios Kalavrouziotis, Papagou (GR)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 17/636,484

(22) PCT Filed: Aug. 21, 2019

(86) PCT No.: PCT/GR2019/000057
§ 371 (c)(1),
(2) Date: Feb. 18, 2022

(87) PCT Pub. No.: WO2021/032999
PCT Pub. Date: Feb. 25, 2021

(65) Prior Publication Data
US 2022/0283973 A1 Sep. 8, 2022

(51) Int. Cl.
*G06F 13/40* (2006.01)
*G06F 13/42* (2006.01)
(52) U.S. Cl.
CPC .......... *G06F 13/4004* (2013.01); *G06F 13/42* (2013.01)
(58) Field of Classification Search
CPC ..... G06F 13/42; G06F 13/4004; H04L 12/12; H04L 12/40039
See application file for complete search history.

(56) References Cited

U.S. PATENT DOCUMENTS 7,194,638 B1 * 3/2007 Larky .................. G06F 1/3209
  713/400
7,945,234 B2 * 5/2011 Lee ......................... H04L 5/16
  455/343.2

(Continued)

FOREIGN PATENT DOCUMENTS

EP      1 599 006 A1    11/2005

OTHER PUBLICATIONS

International Search Report and Written Opinion from International Patent Application No. PCT/GR2019/000057, dated Feb. 21, 2020, 10 pages.

*Primary Examiner* — Brian T Misiura
(74) *Attorney, Agent, or Firm* — Moore & Van Allen PLLC; Michael M. McCraw

(57) ABSTRACT

Apparatuses, systems, and associated methods of manufacturing are described that provide a dynamic data interconnect and networking cable configuration. The dynamic data interconnect includes a substrate, transmitters supported on the substrate configured to generate signals, and receivers supported on the substrate configured to receive signals. The dynamic data interconnect further includes a number of connection pads that receive data cables attached thereto and a number of transmission lanes that operably couple the transmitters and receivers to the connection pads. The dynamic data interconnect further includes transmission circuitry in communication with each of the transmitters and receivers such that, in an operational configuration, the transmission circuitry determines a transmission state of the dynamic data interconnect and selectively disables operation of at least a portion of the transmitters or at least a portion of the receivers.

16 Claims, 6 Drawing Sheets

(56) References Cited

U.S. PATENT DOCUMENTS

| | | |
|---|---|---|
| 10,148,420 B2* | 12/2018 | Govind Km .............. H04L 5/16 |
| 10,314,162 B1 | 6/2019 | Oz et al. |
| 2003/0088799 A1 | 5/2003 | Bodas |
| 2004/0175077 A1 | 9/2004 | Weber |
| 2005/0262284 A1 | 11/2005 | Cherukuri et al. |
| 2008/0222351 A1 | 9/2008 | Verdiell et al. |
| 2016/0041604 A1 | 2/2016 | Choi et al. |
| 2018/0138990 A1* | 5/2018 | Bergsma ................. H04B 1/18 |
| 2018/0306990 A1 | 10/2018 | Badihi |
| 2019/0170951 A1* | 6/2019 | Funada ................ G02B 6/3897 |

* cited by examiner

DYNAMIC BANDWIDTH CONNECTIONS

CROSS-REFERENCE TO RELATED APPLICATIONS

This application is a national phase entry of International Application No. PCT/GR2019/000057, filed Aug. 21, 2019, the entire contents of which application are incorporated herein by reference.

TECHNOLOGICAL FIELD

Example embodiments of the present invention relate generally to network connections and, more particularly, to data interconnects with dynamic bandwidth accommodations.

BACKGROUND

Networking systems may include connections between switch systems, servers, racks, media devices, and other electronics in order to provide for signal transmission between one or more of these elements. Such connections may be made using networking cables, transceivers, networking boxes, interconnects, printed circuit boards (PCBs), and connector assemblies. In some instances, such as in remote media applications, increased bandwidth in these connections is necessary to ensure proper signal transmission. Traditional high bandwidth connections, however, are often bulky, expensive, and/or power intensive.

BRIEF SUMMARY

Example embodiments of the present disclosure provide for data interconnects with dynamic bandwidth accommodations. An example dynamic data interconnect may include a substrate, a plurality of transmitters supported on the substrate configured to generate signals, and a plurality of receivers supported on the substrate configured to receive signals. The interconnect may further include a plurality of connection pads that receive data cables attached thereto and a plurality of transmission lanes that operably couple the transmitters and receivers to the connection pads such that signals generated by the plurality of transmitters are directed via the transmission lanes to the data cables and signals received via the data cables are directed by the transmission lanes to the receivers. The interconnect may further include transmission circuitry in communication with each of the plurality of transmitters and receivers and configured to control operation thereof. In an operational configuration, the transmission circuitry may be configured to determine a transmission state of the dynamic data interconnect and selectively disable operation of at least a portion of the transmitters or at least a portion of the receivers.

In some embodiments, in an instance in which the transmission circuitry determines the transmission state to be a source state of the dynamic data interconnect, the transmission circuitry may be configured to selectively disable operation of at least a portion of the receivers.

In some embodiments, in an instance in which the transmission circuitry determines the transmission state to be a destination state of the dynamic data interconnect, the transmission circuitry may be configured to selectively disable operation of at least a portion of the transmitters.

In some cases, each connection pad may be operably coupled with either a receiver or a transmitter. In other cases, each connection pad may be operably coupled to a transmitter and a receiver.

In some embodiments, the transmission lanes may define electrical traces and the data cables may include an electrical transmission medium.

In other embodiments, the transmission lanes may define optical waveguides and the data cables may include an optical transmission medium. In such an embodiment, the connection pads may include one or more optoelectronic elements that convert between optical and electrical signals.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Overview

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

The example data interconnects described herein may be configured for operation with networking cables, connectors, etc. of any type. By way of example, the dynamic data interconnects may be configured to interact with or operate as a Quad Small Form-factor Pluggable (QSFP), Small Form Pluggable (SFP), C-Form-factor Pluggable (CFP), etc. Moreover, the embodiments of the present invention may also be used with any cable (e.g., passive copper cable (PCC), active copper cable (ACC), or the like) or any interconnect utilized by networking systems and associated switch modules (e.g., an active optical module (AOM), QSFP transceiver module, or the like).

Figure 1:
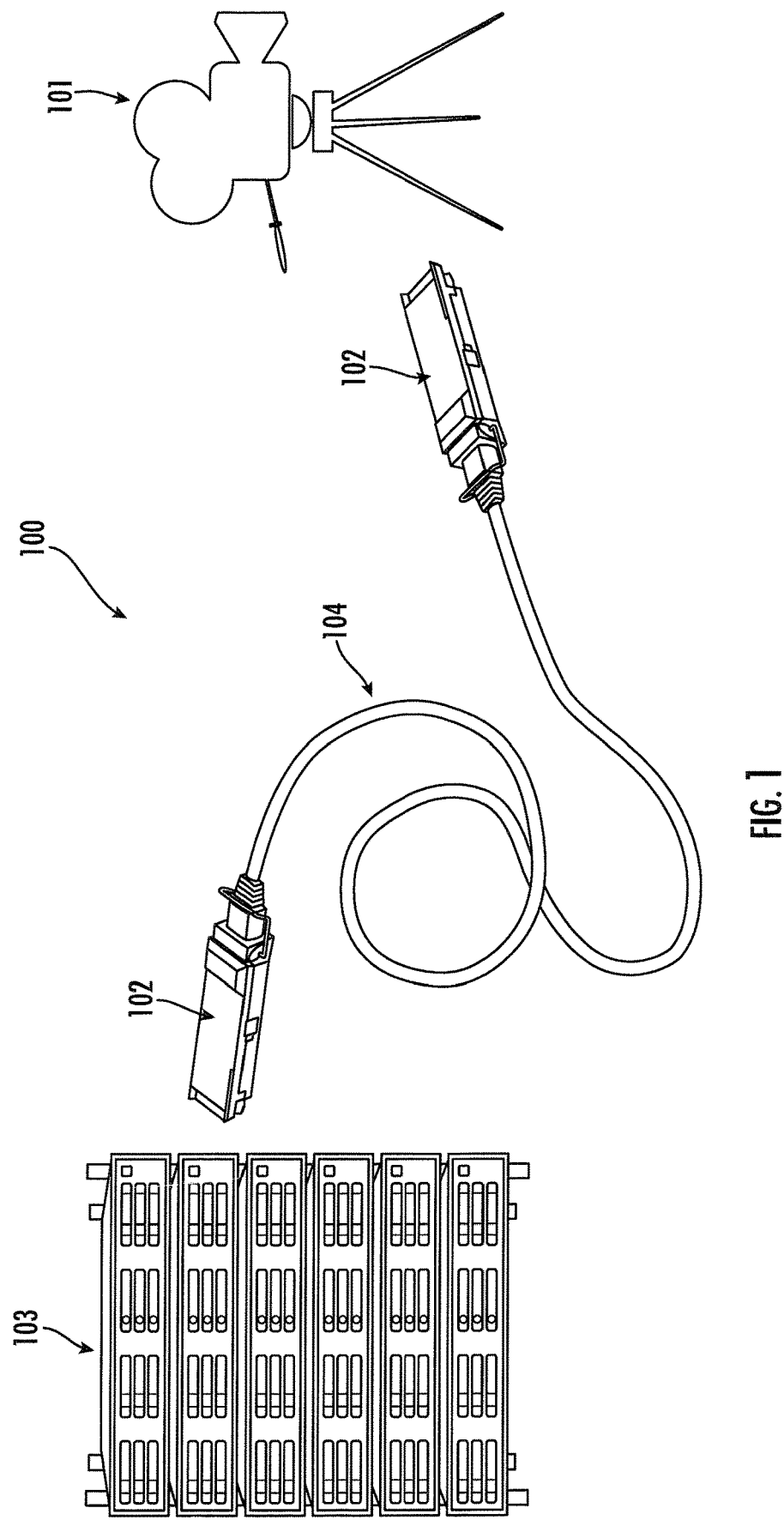
FIG. 1 is a perspective view of a remote media application for implementing some example embodiments described herein.

With reference to FIG. 1, an example remote media application is illustrated for use with some embodiments of the present invention. The remote media application is illustrated with a video camera 101 and server 103 operably connected via a networking cable configuration 100. During operation, the video camera 101 and related media equipment (not shown) may be used to capture high definition video, sound, and the like. In some instances, the video camera 101 may be configured to capture a video stream (e.g., collection of images) in a 4K or 8K resolution. While described herein with reference to a high definition video resolution, the present disclosure contemplates that the video camera 101 may capture images, sound, video, etc. in any resolution based upon the intended application.

The video, images, sound, etc. may be transmitted by the video camera 101 to the server 103 via the networking cable configuration 100. As shown, the networking cable configuration 100 may include dynamic data interconnects 102 each configured to operably mate with the video camera 101 and the server 103. Furthermore, the networking cable configuration 100 may include a data cable 104 extending between the dynamic data interconnects 102. As described hereafter, the data cable 104 may be an electrical transmission medium, an optical transmission medium, or any other transmission medium applicable to networking systems and devices.

In remote media applications, such as illustrated in FIG. 1, high speed (e.g., high bandwidth) interconnects and networking cables are typically used in order to properly transmit signals generated by the video camera 101 (e.g., captured video) to the server 103 for further processing. Remote media applications, however, are often located in outside broadcasting (OB) trucks or other mobile locations, such as sporting events, live musical shows, production studios, etc. As a result, remote media applications do not have access to extensive power supplies capable of efficiently powering operation of the video camera 101 or are expensive to operate due to these large power requirements. In order to satisfy the bandwidth requirements in these application, conventional interconnects are also bidirectional (e.g., allowing communication in either direction) and, therefore, require additional power consumption in order to remain operational.

While described herein with reference to a remote (e.g., mobile) media application illustrated in FIG. 1, the present disclosure contemplates that the devices described herein may also be applicable to any implementation in which data transmission is required. By way of example, internet of things (IOT) applications rely upon devices that periodically transmit information to a server (e.g., physical, cloud-based, or otherwise) and these transmissions are often unidirectional (e.g., from the IOT device to the server). Attempting to deploy traditional high bandwidth cables in such IOT implementations, however, is cost intensive.

To address these issues and others, the dynamic data interconnect and associated networking cable configurations of the present application are configured to selectively disable operation of transmitters and receivers of the interconnect in order to reduce the power consumption and associated cost for high bandwidth transmissions. As described hereafter, the dynamic data interconnect may determine a transmission state of the interconnect (e.g., source state or destination state) and selectively enable or disable portions of the transmitters and receivers of the interconnect. In this way, the data interconnects of the present application may dynamically address bandwidth needs and power concerns while minimizing cost.

Dynamic Data Interconnects

Figure 2:
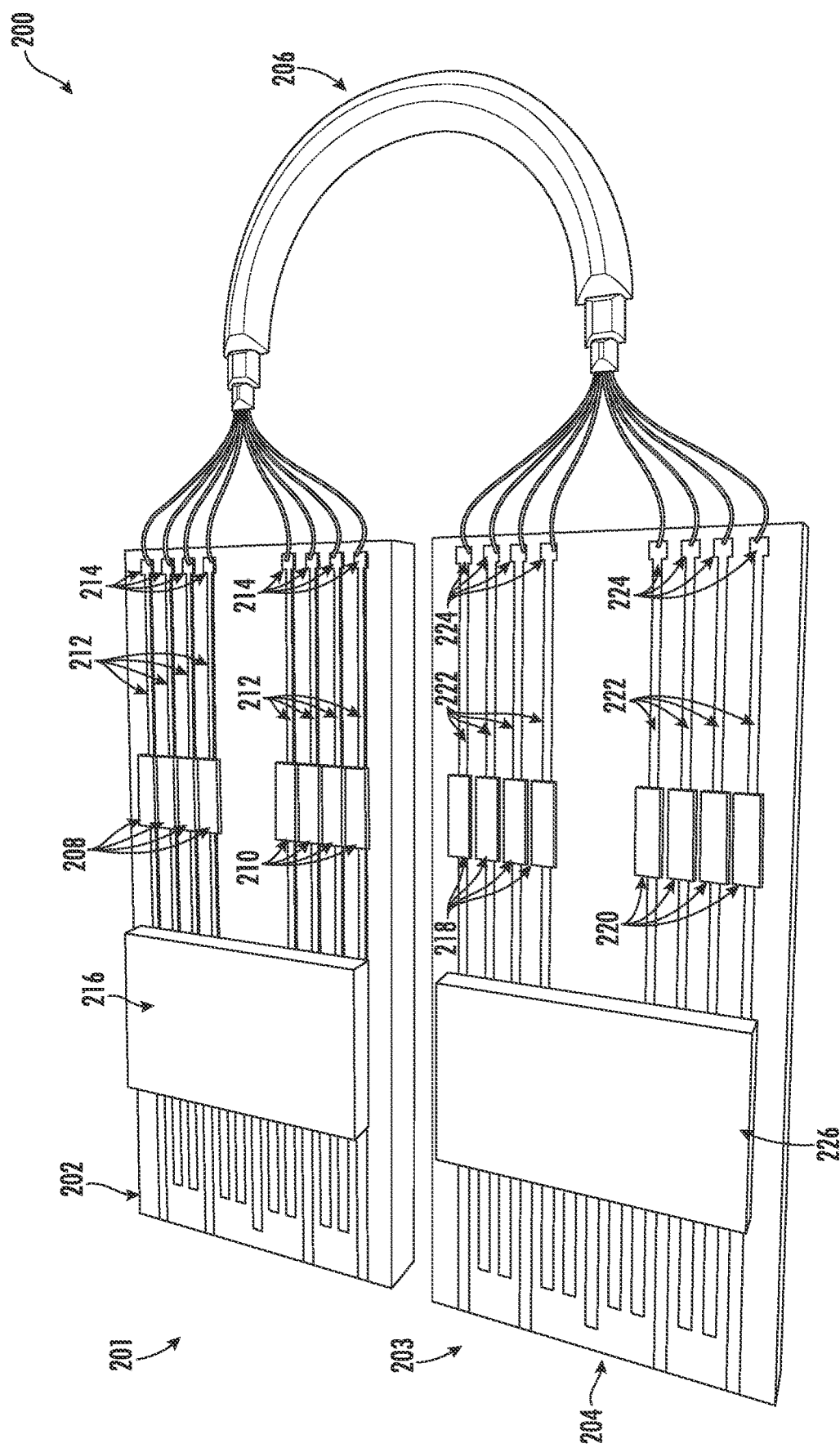
FIG. 2 is a perspective view of an example dynamic data interconnect according to an example embodiment.

With reference to FIG. 2, an example networking cable configuration 200 (e.g., cable 200) is illustrated. As shown, the cable 200 includes dynamic data interconnects (e.g., first dynamic data interconnect 201 and second dynamic data interconnect 203) connected via a data cable 206. As would be evident to one of ordinary skill in the art and as illustrated herein, the data cable 206 may comprise a plurality of individual data cables, optical fibers, electrical wires, or the like configured to transmit signals. For the sake of clarity of description, the dynamic data interconnects of the present disclosure are described herein with reference to a single data cable (e.g., data cable 206 in FIG. 2, data cable 306 in FIG. 3, and data cable 406 in FIGS. 4-5).

With continued reference to FIG. 2, the cable 200 includes a first dynamic data interconnect 201 and a second dynamic data interconnect 203 that, in some embodiments, may be substantially identical in configuration to one another. As shown, the first dynamic data interconnect 201 may include a substrate 202 supporting a plurality of transmitters 208 that are configured to generate signals and a plurality of receivers 210 that are configured to receive signals. In some embodiments, the first dynamic data interconnect 201 may be configured for use with electrical communication systems (e.g., active copper cables or the like) such that the plurality of first transmitters 208 is configured to generate an electrical signal for transmission by the data cable 206 to the second dynamic data interconnect 203. In some instances, the plurality of first transmitters 208 may receive instructions (e.g., electrical signals) from transmission circuitry described hereafter (e.g., first transmission circuitry 216) configured to cause generation of the electrical signals by the first transmitters 208.

In other embodiments, the plurality of first transmitters 208 may be configured for use with optical communication systems (e.g., optical fibers or the like) such that the plurality of first transmitters 208 is configured to generate an optical signal for transmission by the data cable 206 to the second dynamic data interconnect 203. As would be evident to one of ordinary skill in the art in light of the present disclosure, the first transmitters 208 may each define vertical-cavity surface-emitting lasers (VCSELs) or other related optical transmitters configured to generate optical signals.

The first dynamic data interconnect 201 may also support a plurality of receivers 210 that are configured to receive signals. As above, in some embodiments, the first dynamic data interconnect 201 may be configured for use with electrical communication systems (e.g., active copper cables or the like) such that the plurality of first receivers 210 are configured to receive an electrical signal from the data cable 206 generated by the corresponding transmitters of the second dynamic data interconnect 203 as described hereafter. In some instances, the plurality of first receivers 208 may receive electrical signals from the data cable 206 and transmit these electrical signals to the first transmission circuitry 216 for further transmission to other networking system components (not shown).

In other embodiments, the plurality of first receivers 210 may be configured for use with optical communication systems (e.g., optical fibers or the like) such that the plurality of first receivers 208 are configured to receive an optical signal transmitted by the data cable 206 from the second dynamic data interconnect 203. As would be evident to one of ordinary skill in the art in light of the present disclosure, the first receivers 210 may each define photodiodes or other related optical receivers configured to receive optical signals.

In order to operably couple the plurality of first transmitters 208 and the plurality of first receivers 210 of the first dynamic data interconnect 201 with corresponding elements of the second dynamic data interconnects 203 (i.e., so as to form a networking cable configuration 200), the first dynamic data interconnect 201 may include a plurality of first connection pads 214 configured to receive the data cable 206 attached thereto and a plurality of first transmission lanes 212 configured to operably couple the plurality of first transmitters 208 and the plurality of first receivers 210 to the first connection pads 214. As described above and illustrated in FIG. 2, the plurality of first connection pads 214 may be configured to receive one or more corresponding wires, fibers, or the like of the data cable 206 attached thereto. In implementations in which the cable 200 is configured for use with electrical communication systems, the data cable 206 (e.g., a collection of data cables) may comprise an electrical transmission medium (e.g., electrical trace, wire, coil, thread, etc.). In other implementations in which the cable 200 is configured for use with optical communication systems, the data cable 206 (e.g., a collection of data cables) may comprise an optical transmission medium (e.g., optical fibers, filaments, etc.).

As noted above, the first dynamic data interconnect 201 may include a plurality of first transmission lanes 212 configured to operably couple the plurality of first transmitters 208 and the plurality of first receivers 210 to the first connection pads 214 such that signals may pass between the data cable 206 and the first transmitters 208 and the first receivers 210. In implementations in which the cable 200 is configured for use with electrical communication systems, the first transmissions lanes 212 may comprise electrical traces, wires, etc. configured to direct electrical signals. In other implementations in which the cable 200 is configured for use with optical communication systems, the first transmissions lanes 212 may comprise optical waveguides or equivalent structures configured to direct optical signals. As shown in the embodiment illustrated in FIG. 2, in some instances, each first connection pad 214 is operably coupled with either a first receiver 210 or a first transmitter 208.

With continued reference to FIG. 2, the networking cable configuration 200 (e.g., cable 200) is illustrated with a second dynamic data interconnect 203 operably connected to the first dynamic data interconnect 201 via the data cable 206. As illustrated and described above, the second dynamic data interconnect 203 may also include a substrate 204 supporting a plurality of second transmitters 218 configured to transmit signals and a plurality of second receivers 220 configured to receive signals. Furthermore, the second dynamic data interconnect 203 may include a plurality of second connection pads 224 configured to receive data cables (e.g., data cable 206) attached thereto, and a plurality of second transmission lanes 222 configured to operably couple the second transmitters 218 and second receivers 220 to the second connection pads 224. The second dynamic data interconnect 203 may also include second transmission circuitry 226 in communication with each of the plurality of second transmitters 218 and second receivers 220 and configured to control operation thereof.

For the sake of convenience of description, the communication elements of the second dynamic data interconnect 203 may operate similarly to those of the first dynamic data interconnect 201 such that the first and second dynamic data interconnects 201, 203 may operate to form a networking cable configuration 200 with dynamic bandwidth accommodations. By way of example, the first transmission circuitry 216 may instruct or otherwise cause one or more of the plurality of first transmitters 208 to generate one or more signals (e.g., optical, electrical, or the like). These signals may be directed by the plurality of first transmission lanes 212 to the plurality of first connection pads 214, through the data cable 206, and to the corresponding plurality of second connection pads 224 and second transmission lanes 222. The second transmission lanes 222 may then direct the signals to one or more corresponding second receivers 220 that may subsequently transmit the signals to the second transmission circuitry 226, and vice versa.

In an operational configuration, such as shown in FIG. 1 in which the first dynamic data interconnect 201 and the second dynamic interconnect 203 are operably coupled to one or more networking components, the first transmission circuitry 216 and/or the second transmission circuitry 226 may be configured to determine a transmission state of the dynamic data interconnect(s) 201, 203. In this way, the transmission circuitry 216, 226 may, in response to the determined transmission state, selectively disable operation of at least a portion of the transmitters 208, 218 and/or at least a portion of the receivers 210, 220. As would be evident to one of ordinary skill in the art in light of the present disclosure, a portion may refer to one or more of the transmitters 208, 218 and/or receivers 210, 220 in any combination. In this way, the dynamic data interconnects and associated networking cable configurations may dynamically address bandwidth in networking connections while minimizing cost and power consumption.

By way of example, the first transmission circuitry 216 may determine a source state of the first dynamic data interconnect 201, such as in instances in which the first dynamic data interconnect 201 is operably coupled to the video camera 101 or other data source. In response, the first transmission circuitry 216 may be configured to selectively disable operation of at least a portion of the plurality of first receivers 210. As would be evident to one of ordinary skill in the art in light of the present disclosure, if the first dynamic data interconnect 201 is in a source state, the plurality of first receivers 210 may not receive signals (i.e., the first dynamic data interconnect 201 is unidirectionally transmitting signals).

Similarly, in an instance in which the transmission circuitry 216, 226 determines a destination state of the dynamic data interconnect 201, 203, the transmission circuitry 216, 226 is configured to selectively disable operation of at least a portion of the transmitters 208, 218. By way of continued example, the second transmission circuitry 226 may determine a destination state of the second dynamic data interconnect 203, such as in instances in which the second dynamic data interconnect 203 is operably coupled to the server 103 or other data recipient. In response, the second transmission circuitry 226 may be configured to selectively disable operation of at least a portion of the plurality of second transmitters 218. As would be evident to one of ordinary skill in the art in light of the present disclosure, if the second dynamic data interconnect 203 is in a destination state, the plurality of second transmitters 218 may not generate signals (i.e., the second dynamic data interconnect 203 favors receiving signals and/or the first dynamic data interconnect 201 allocates more bandwidth in a transmitting direction). In this way, the networking cable configuration 200 may operate to selectively enable and disable signal generation and/or receipt for either the first dynamic data interconnect 201 or the second dynamic data interconnect 203 so as to dynamically adjust bandwidth and power for these connections.

In order to perform this transmission state determination, the first transmission circuitry 216 and/or the second transmission circuitry 226 may be embodied in any number of different ways and may, for example, include one or more processing devices configured to perform independently. Furthermore, the transmission circuitry 216, 226 may be understood to include a single core processor, a multi-core processor, and/or the like. By way of example, the transmission circuitry 216, 226 may be configured to execute instructions stored in a memory or otherwise accessible to one or more processors of the transmission circuitry 216, 226. Alternatively, or additionally, the transmission circuitry 216, 226 may be configured to execute hard-coded functionality. As such, whether configured by hardware or by a combination of hardware with software, the transmission circuitry 216, 226 may represent an entity (e.g., physically embodied in circuitry) capable of performing operations according to an embodiment of the present invention while configured accordingly.

By way of example, in some embodiments, the transmission circuitry 216, 226 may be configured to disable transmitters (e.g., first transmitters 208 or second transmitters 218, respectively) and receivers (e.g., first receivers 210 or second receivers 220, respectively) according to traffic (e.g., data bandwidth) detected at their respective inputs. In other embodiments, the data interconnect may receive a control signal or equivalent input indicating the number of transmitters or receivers that should be operated from host equipment (e.g., video camera 101 and/or server 103).

Figure 3:
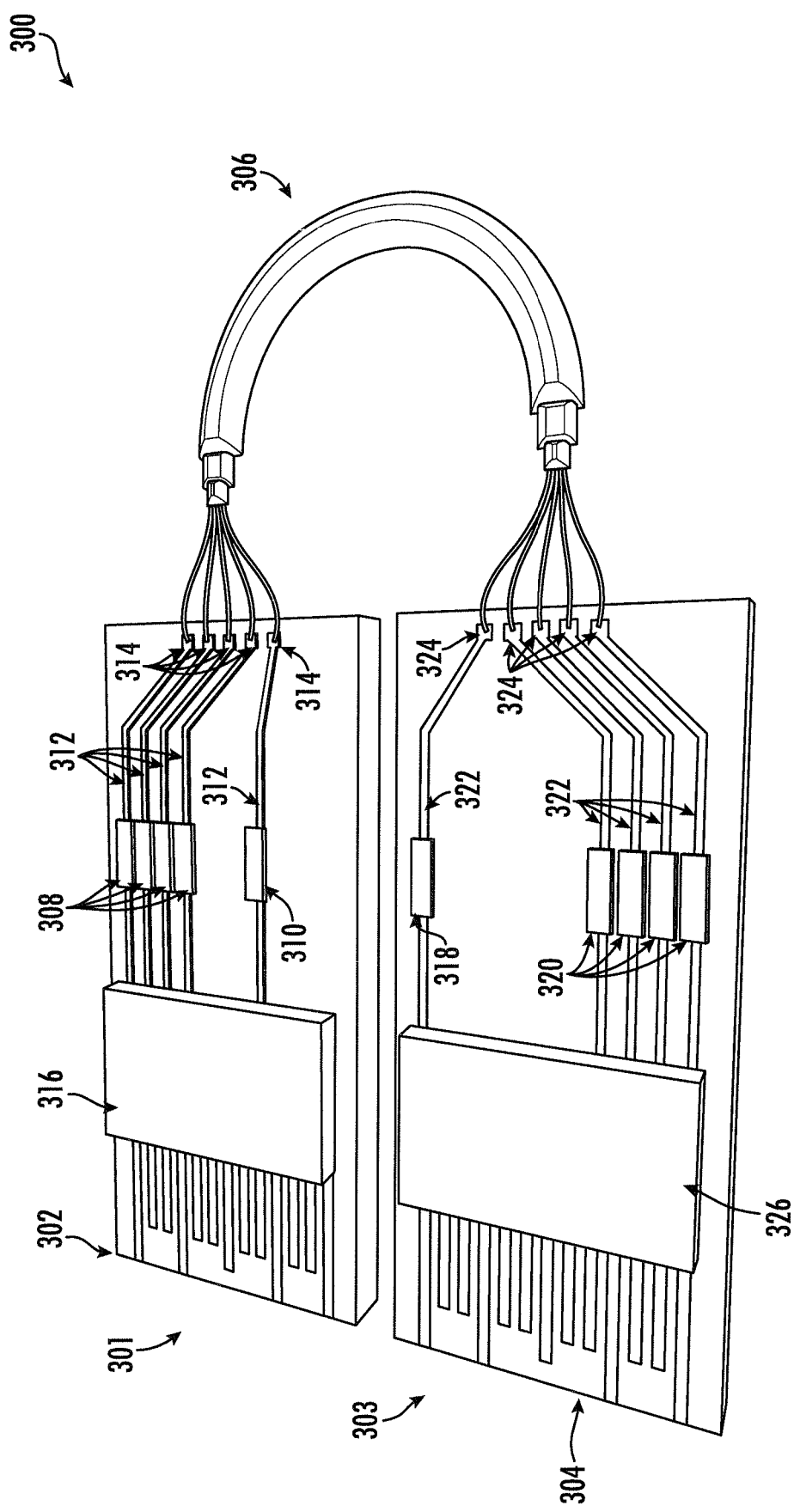
FIG. 3 is a perspective view of another example dynamic data interconnect according to an example embodiment.

With reference to FIG. 3, another example networking cable configuration 300 (e.g., cable 300) is illustrated. As shown, the cable 300 includes dynamic data interconnects (e.g., first dynamic data interconnect 301 and second dynamic data interconnect 303) connected via a data cable 306. As would be evident to one of ordinary skill in the art and as illustrated herein, the cable 300 and associated dynamic data interconnects 301, 303 may include elements similar to those described above with reference to FIG. 2. In the cable 300 of FIG. 3, however, the dynamic data interconnects 301, 303 are configured such that the first dynamic data interconnect 301 is primarily in a source state and the second dynamic data interconnect 303 is primarily in a destination state. As shown, the first dynamic data interconnect 301 includes a substrate 302 supporting a plurality of first transmitters 308 and a single first receiver 310. As above, each of these first transmitters 308 and first receiver 310 are operably coupled to a data cable 306 attached to a plurality of first connections pads 314 via a plurality of first transmission lanes 312. The second dynamic data interconnect 303 includes a substrate 304 supporting a plurality of second receivers 320 and a single second transmitter 318. Similar to the first dynamic data interconnect 301, each of these second receivers 320 and second transmitter 318 are operably coupled to a data cable 306 attached to a plurality of second connections pads 324 via a plurality of second transmission lanes 322.

In the embodiment of FIG. 3, the first transmission circuitry 316 may determine a source state of the first dynamic data interconnect 301, such as in instances in which the first dynamic data interconnect 301 is operably coupled to the video camera 101 or other data source. Similarly, the second transmission circuitry 326 may determine a destination state of the second dynamic data interconnect 303, such as in instances in which the second dynamic data interconnect 303 is operably coupled to the server 103 or other data recipient. Alternatively, the first dynamic data interconnect 301 may be configured as the primary source connection such that a default determination of the first transmission circuitry 316 is that the first dynamic data interconnect 301 is in a source state. Similarly, the second dynamic data interconnect 303 may be configured as the primary destination connection such that a default determination of the second transmission circuitry 326 is that the second dynamic data interconnect 303 is in a destination state.

With continued reference to FIG. 3, during operation, the first transmission circuitry 316 and/or the second transmission circuitry 326 may be configured to determine a transmission state of the networking cable configuration 300 and selectively enable communication between the first receiver 310 and the second transmitter 318. By way of example, the second transmission circuitry 326 may receive instructions (e.g., signals) from the server 103 for transmission to the video camera 101. In this instance, the second transmission circuitry 326 may determine that the transmission state for the second dynamic data interconnect 303 is a source state and selectively enable the second transmitter 318. Similarly, the first receiver 310 may receive the signal transmitted by the second transmitter 318 and, in turn, the first transmission circuitry 316 may determine that the first dynamic data interconnect 301 is in a destination state (in whole or in part). In this way, the networking cable configuration 300 may minimize the bandwidth and/or power directed to the first receiver 310 and the second transmitter 318 until transmission is necessary. While described and illustrated herein with reference to a single first receiver 210 of the first dynamic data interconnect 301 and a single second transmitter 318 of the second dynamic data interconnect 303, the present disclosure contemplates that the dynamic data interconnects described herein may include any number of transmitters or receivers based upon the intended application. Furthermore, while the cable 300 is described herein with reference to transmission states, the present disclosure contemplates that, in such a directional embodiment, the transmission states of the cable 300 may be defined by the physical installation of the associated dynamic data interconnects 301, 303 (e.g., the correct interconnect must be installed with the correct corresponding element).

Figure 4:
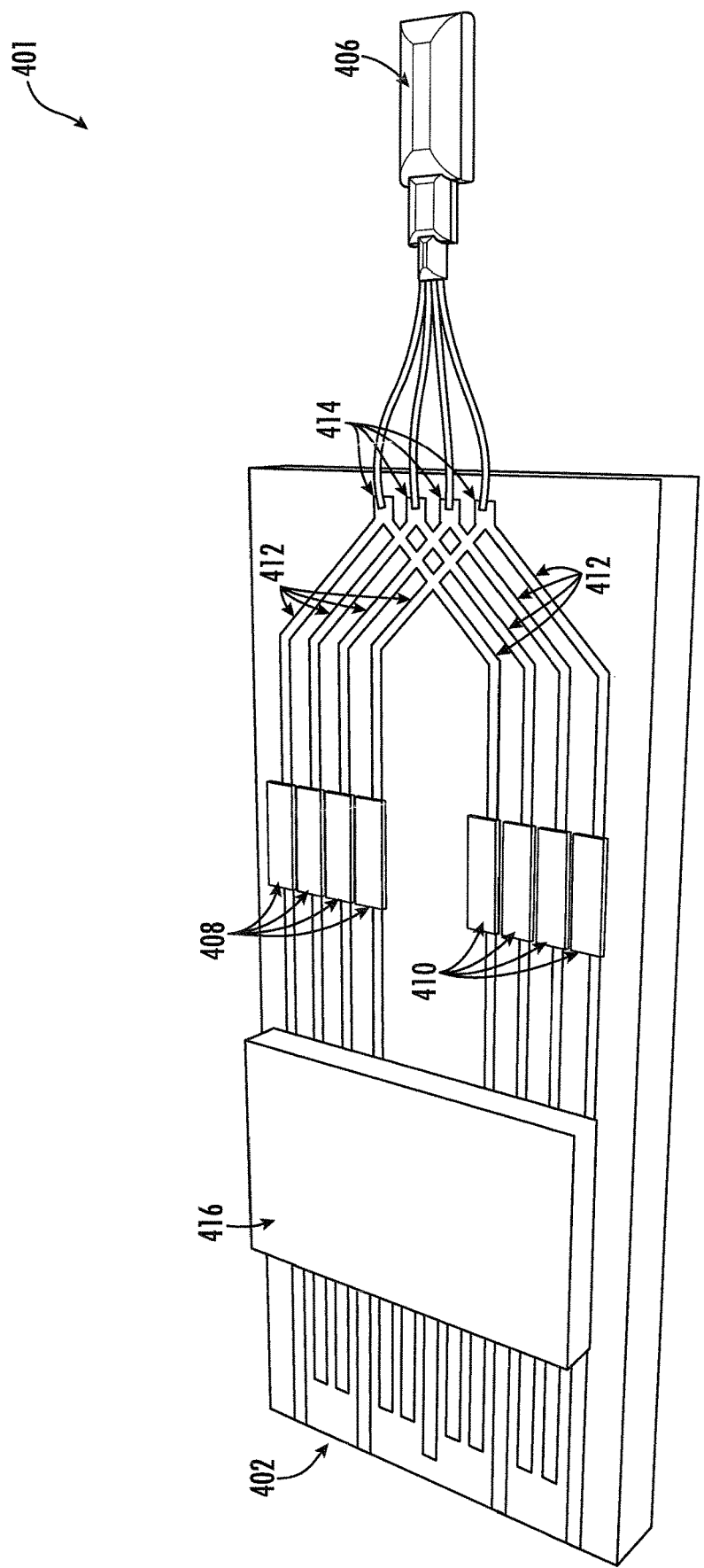
FIG. 4 is a perspective view of a further example dynamic data interconnect according to an example embodiment.
Figure 5:
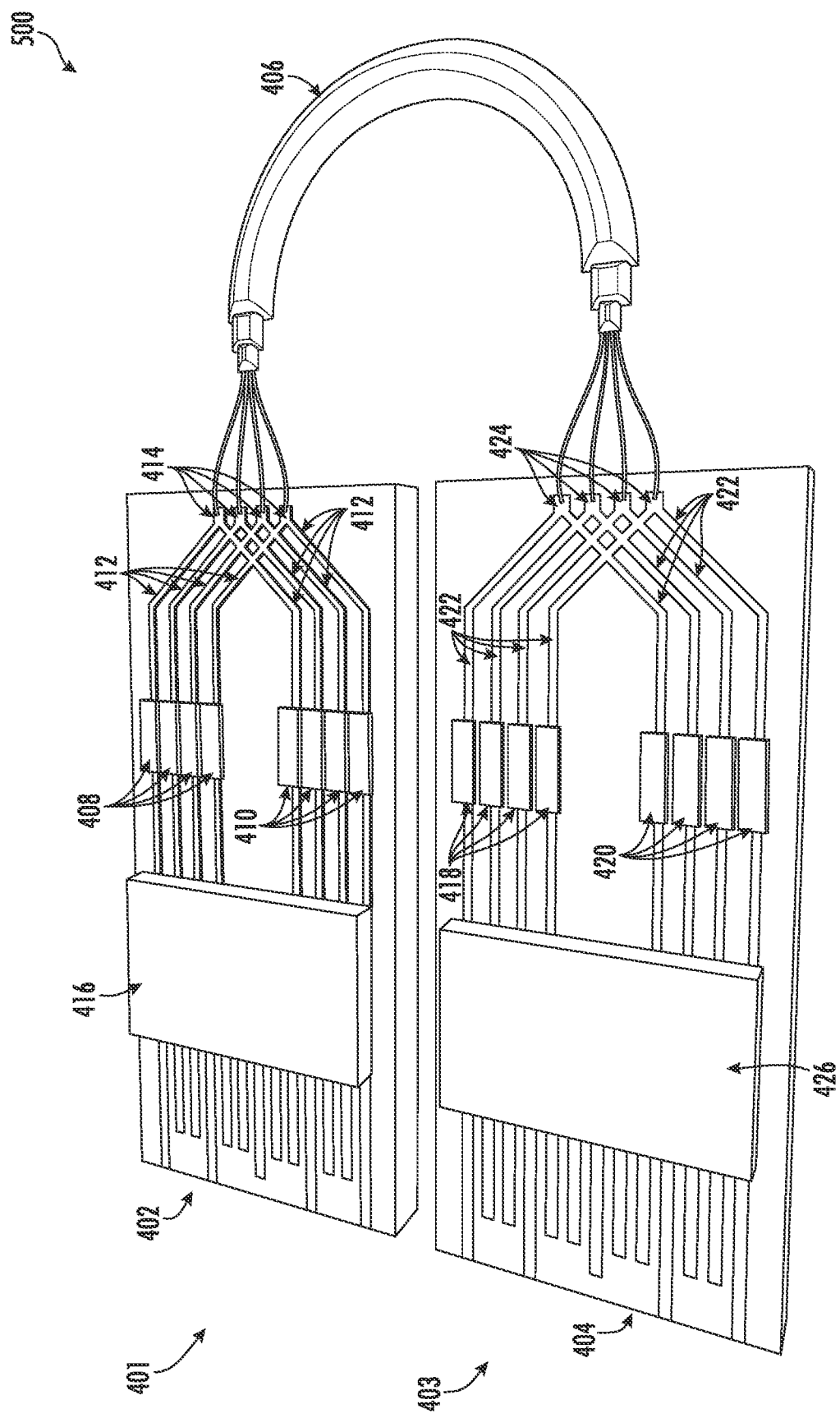
FIG. 5 is networking cable configuration including the dynamic data interconnect of FIG. 4 according to an example embodiment.

With reference to FIGS. 4-5, another example dynamic data interconnect 401 and associated networking cable configuration 400 (e.g., cable 400) are illustrated. As shown, the cable 400 includes dynamic data interconnects (e.g., first dynamic data interconnect 401 and second dynamic data interconnect 403) connected via a data cable 406. As would be evident to one of ordinary skill in the art and as illustrated herein, the cable 400 and associated dynamic data interconnects 401, 403 may include elements similar to those described above with reference to FIG. 2. In the cable 400 of FIGS. 4-5, however, the respective connection pads for each dynamic data interconnect 401, 403 are operably coupled to a transmitter and a receiver.

As shown, the first dynamic data interconnect 401 includes substrate 402 supporting a plurality of first transmitters 408 and a plurality of first receivers 410. As above, each of these first transmitters 408 and first receivers 410 are operably coupled to a data cable 406 attached to a plurality of first connections pads 414 via a plurality of first transmission lanes 414. The second dynamic data interconnect 403 of FIG. 5 includes a substrate 404 supporting a plurality of second transmitters 418 and a plurality of second receivers 420. Similar to the first dynamic data interconnect 401, each of these second transmitters 418 and second receivers 420 are operably coupled to a data cable 406 attached to a plurality of second connections pads 424 via a plurality of second transmission lanes 422.

In an operational configuration, the embodiment of FIGS. 4-5 may operate similar to the embodiment of FIG. 2. In particular, the first transmission circuitry 416 and/or the second transmission circuitry 426 may be configured to determine a transmission state of the dynamic data interconnect(s) 401, 403. In this way, the transmission circuitry 416, 426 may, in response to the determined transmission state, selectively disable operation of at least a portion of the transmitters 408, 418 or at least a portion of the receivers 410, 420. By way of example, the first transmission circuitry 416 may determine a source state of the first dynamic data interconnect 401, such as in instances in which the first dynamic data interconnect 401 is operably coupled to the video camera 101 or other data source. In response, the first transmission circuitry 416 may be configured to selectively disable operation of at least a portion of the plurality of first receivers 410. As would be evident to one of ordinary skill in the art in light of the present disclosure, if the first dynamic data interconnect 401 is in a source state, the plurality of first receivers 410 may not receive signals (i.e., the first dynamic data interconnect 401 is unidirectionally transmitting signals).

Similarly, in an instance in which the transmission circuitry 416, 426 determines a destination state of the dynamic data interconnect 401, 403, the transmission circuitry 416, 426 is configured to selectively disable operation of at least a portion of the transmitters 408, 418. By way of continued example, the second transmission circuitry 426 may determine a destination state of the second dynamic data interconnect 403, such as in instances in which the second dynamic data interconnect 403 is operably coupled to the server 103 or other data recipient. In response, the second transmission circuitry 426 may be configured to selectively disable operation of at least a portion of the plurality of second transmitters 418. As would be evident to one of ordinary skill in the art in light of the present disclosure, if the second dynamic data interconnect 403 is in a destination state, the plurality of second transmitters 418 may not generate signals (i.e., the second dynamic data interconnect 403 is unidirectionally receiving signals).

In the embodiment of FIGS. 4-5, the plurality of first transmitters 408 and the plurality of first receivers 410 may each be connected in pairs, via the first transmission lanes 412, to the first connection pads 414, such as via a multilayer substrate 402. In an instance in which the first transmission circuitry 416 determines a source state for the first dynamic data interconnect 401, the first transmission circuitry 416 may enable one or more of the first transmitters 408 and, by extension, disable one or more corresponding first receivers 410. Said differently, given that each first transmitter 408 shares a first connection pad 414 with a first receiver 410, only one of the first transmitter 408 and first receiver 410 pair may operate at any given time (e.g., each pair/lane may operate in a half-duplex mode). As such, the cable 400 and associate dynamic data interconnects 401, 403 of FIGS. 4-5 may provide further adaptability and dynamic bandwidth adjustment than conventional devices. In an instance in which the cable 400 is configured for use with optical communication systems, the connection pads 414, 424 may further comprise one or more optoelectronic elements (e.g., VCSELs, photodiodes, etc.) configured to convert between optical and electrical signals.

Example Method of Manufacture

Figure 6:
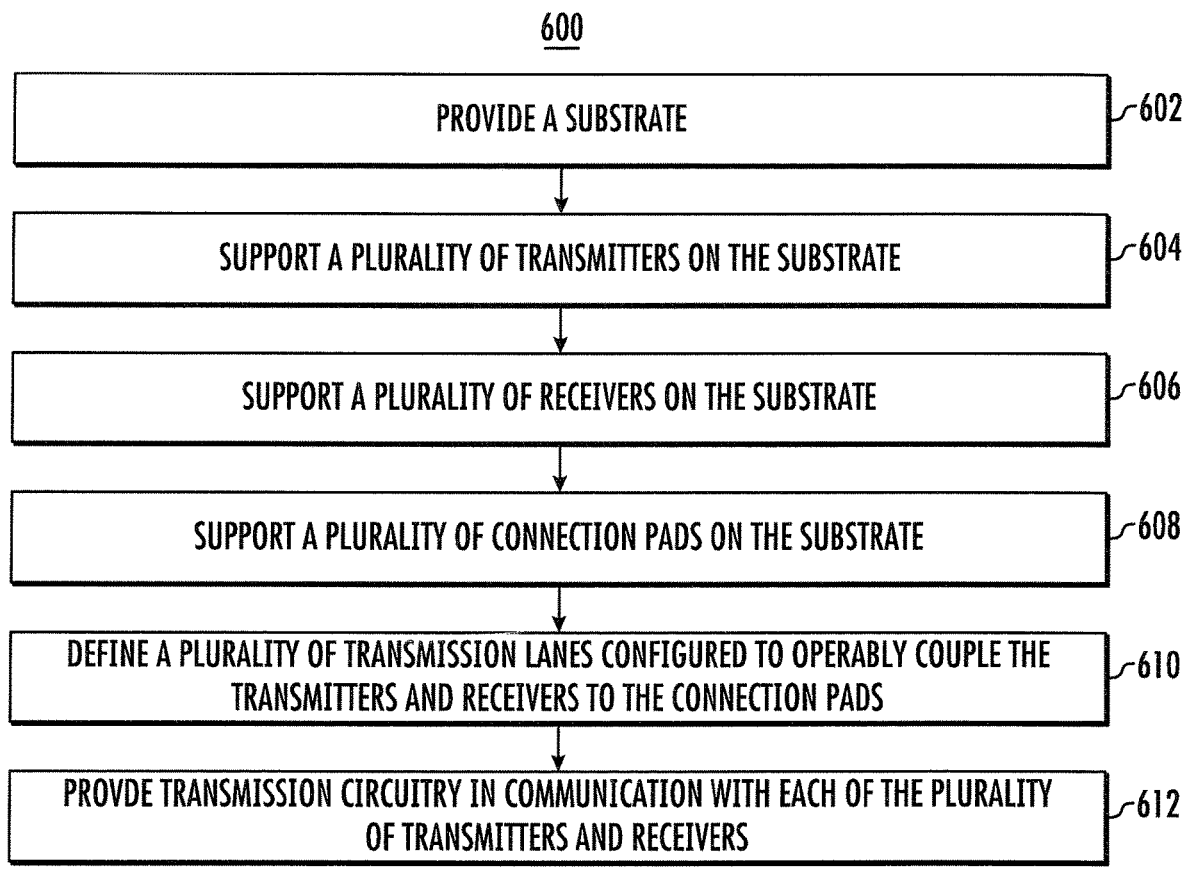
FIG. 6 is a flowchart illustrating a method of manufacturing a dynamic data interconnect according to an example embodiment.

With reference to FIG. 6, a method of manufacturing a dynamic data interconnect according to embodiments of the invention is illustrated. The method (e.g., method 600) may include the step of providing a substrate at Block 602. The method 600 may utilize any known means for creating substrates (e.g., subtractive processes, additive processes, semi-additive processes, chemical etching, copper patterning, lamination, plating and coating, or the like) at Block 602. The method 600 may also include supporting a plurality of transmitters on the substrate at Block 604. As described above, the plurality of transmitters may be configured to generate signals. In instance in which the dynamic data interconnect is configured for use with electrical communication system (e.g., active copper cables or the like) the plurality of transmitters may be configured to generate an electrical signal. In instance in which the dynamic data interconnect is configured for use with optical communication system (e.g., optical fibers or the like), the plurality of transmitters may be configured to generate an optical signal (i.e., the plurality of transmitters may define vertical-cavity surface-emitting lasers (VCSELs) or other related optical transmitters configured to generate optical signals).

The method 600 may also include supporting a plurality of receivers on the substrate at Block 606. In instance in which the dynamic data interconnect is configured for use with electrical communication systems (e.g., active copper cables or the like) the plurality of receivers may be configured to receive an electrical signal. In an instance in which the dynamic data interconnect is configured for use with optical communication systems (e.g., optical fibers or the like), the plurality of receivers may be configured to receive an optical signal (i.e., the plurality of receivers may define photodiodes or other related optical transmitters configured to generate optical signals).

The method 600 may also include supporting a plurality of connection pads on the substrate at Block 608 and defining a plurality of transmission lanes configured to operably couple the transmitters and receivers to the connection pads at Block 610. As described above, the plurality of connection pads 214 may be configured to receive one or more corresponding wires, fibers, or the like of a data cable attached thereto. The plurality of transmission lanes may also be configured to operably couple the plurality of transmitters and the plurality of receivers to the first connection pads such that signals may pass between the data cable and the first transmitters and the first receivers. In implementations in which the cable is configured for use with electrical communication systems, the transmissions lanes may comprise electrical traces, wires, etc. configured to direct electrical signals. In other implementations in which the cable is configured for use with optical communication systems, the first transmissions lanes may comprise optical waveguides or equivalents configured to direct optical signals.

The method 600 may also include providing transmission circuitry in communication with each of the plurality of transmitters and receivers at Block 612. The transmission circuitry may be embodied in any number of different ways and may, for example, include one or more processing devices configured to perform independently. Furthermore, the transmission circuitry may be understood to include a single core processor, a multi-core processor, and/or the like. As such, the transmission circuitry may represent an entity (e.g., physically embodied in circuitry) capable of performing operations according to an embodiment of the present invention while configured accordingly.

In an operational configuration, the transmission circuitry may be configured to determine a transmission state of the dynamic data interconnect. In this way, the transmission circuitry may, in response to the determined transmission state, selectively disable operation of at least a portion of the transmitters or at least a portion of the receivers. In this way, the dynamic data interconnects and associated networking cable configurations may dynamically address bandwidth needs and power concerns in networking connections while minimizing cost.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A dynamic data interconnect comprising:
   a substrate;
   a plurality of transmitters supported on the substrate, wherein the transmitters are configured to generate signals;
   a plurality of receivers supported on the substrate, wherein the receivers are configured to receive signals;
   a plurality of connection pads configured to receive data cables attached thereto;
   a plurality of transmission lanes configured to operably couple the transmitters and receivers to the connection pads such that signals generated by the plurality of transmitters are directed via the transmission lanes to the data cables and signals received via the data cables are directed by the transmission lanes to the receivers; and
   transmission circuitry in communication with each of the plurality of transmitters and receivers and configured to control operation thereof,
   wherein, in an operational configuration, the transmission circuitry is configured to determine that a transmission state of the dynamic data interconnect is a source state and selectively disable operation of each of the plurality of receivers other than a first receiver.

2. The dynamic data interconnect according to claim 1, wherein, following determination of the source state of the dynamic data interconnect, the transmission circuitry is configured to:
   determine the transmission state to be a destination state of the dynamic data interconnect,
   selectively disable operation of at least a portion of the transmitters, and
   selectively enable at least a portion of the receivers.

3. The dynamic data interconnect according to claim 1, wherein the transmission lanes comprise:
   electrical traces and the data cables comprise an electrical transmission medium; or
   the transmission lanes comprise optical waveguides and the data cables comprise an optical transmission medium.

4. The dynamic data interconnect according to claim 1, wherein the number of receivers is less than the number of transmitters.

5. The dynamic data interconnect according to claim 1, wherein, in determining the transmission state to be the source state of the dynamic data interconnect, the transmission circuitry is configured to selectively disable a portion of the plurality of the receivers such that the number of transmitters that are enabled is greater than the number of receivers that are enabled.

6. A networking cable configuration comprising:
   a first dynamic data interconnect comprising:
      a first substrate;
      a plurality of first transmitters supported on the first substrate, wherein the first transmitters are configured to generate signals;
      only a first receiver supported on the first substrate, wherein the first receiver is configured to receive signals;
      a plurality of first connection pads;
      a plurality of first transmission lanes, wherein each first transmission lane is configured to operably couple the plurality of first transmitters and the first receiver to the first connection pads; and
      first transmission circuitry in communication with each of the plurality of first transmitters and the first receiver and configured to control operation thereof;
   a second dynamic data interconnect comprising:
      a second substrate;
      a plurality of second receivers supported on the second substrate, wherein the second receivers are configured to receive signals;
      only a second transmitter supported on the second substrate, wherein the second transmitter is configured to generate signals;
      a plurality of second connection pads;
      a plurality of second transmission lanes, wherein each second transmission lane is configured to operably couple the plurality of second receivers and the second transmitter to the second connection pads;
      second transmission circuitry in communication with each of the plurality of second receivers and the second transmitter and configured to control operation thereof; and
   a plurality of data cables configured to operably connect the first connection pads of the first dynamic data interconnect with the second connection pads of the second dynamic data interconnect,
   wherein, in an operational configuration, the first transmission circuitry and the second transmission circuitry are configured to determine a transmission state of the networking cable configuration and selectively enable communication between the first receiver and the second transmitter.

7. The networking cable configuration according to claim 6, wherein, in an instance in which the first transmission circuitry determines the transmission state to be a source state of the first dynamic data interconnect, the first transmission circuitry is configured to selectively disable operation of the first receiver.

8. The networking cable configuration according to claim 6, wherein, in an instance in which the first transmission circuitry determines the transmission state to be a destination state of the first dynamic data interconnect, the first transmission circuitry is configured to selectively enable operation of the first receiver.

9. The networking cable configuration according to claim 6, wherein, in an instance in which the second transmission circuitry determines the transmission state to be a destination state of the second dynamic data interconnect, the second transmission circuitry is configured to selectively disable operation of the second transmitter.

10. The networking cable configuration according to claim 6, wherein, in an instance in which the second transmission circuitry determines the transmission state to be a source state of the second dynamic data interconnect, the second transmission circuitry is configured to selectively enable operation of the second transmitter.

11. The networking cable configuration according to claim 6, wherein the first transmission lanes and the second transmission lanes comprise electrical traces and the data cables comprise an electrical transmission medium.

12. The networking cable configuration according to claim 6, wherein the first transmission lanes and the second transmission lanes comprise optical waveguides and the data cables comprise an optical transmission medium.

13. A dynamic data interconnect comprising:
a substrate;
a plurality of transmitters supported on the substrate, wherein the transmitters are configured to generate signals;
a plurality of receivers supported on the substrate, wherein the receivers are configured to receive signals;
a plurality of connection pads configured to receive data cables attached thereto;
a plurality of transmission lanes configured to operably couple the transmitters and receivers to the connection pads such that signals generated by the plurality of transmitters are directed via the transmission lanes to the data cables and signals received via the data cables are directed by the transmission lanes to the receivers; and
transmission circuitry in communication with each of the plurality of transmitters and receivers and configured to control operation thereof,
wherein, in an operational configuration, the transmission circuitry is configured to determine that a transmission state of the dynamic data interconnect is a destination state and selectively disable operation of each of the plurality of the transmitters other than a first transmitter.

14. The dynamic data interconnect according to claim 13, wherein the transmission lanes comprise:
electrical traces and the data cables comprise an electrical transmission medium; or
the transmission lanes comprise optical waveguides and the data cables comprise an optical transmission medium.

15. The dynamic data interconnect according to claim 13, wherein the number of transmitters is less than the number of receivers.

16. The dynamic data interconnect according to claim 13, wherein, in determining the transmission state to be the destination state of the dynamic data interconnect, the transmission circuitry is configured to selectively disable a portion of the plurality of transmitters such that the number of receivers that are enabled is greater than the number of transmitters that are enabled.

\* \* \* \* \*